(12) United States Patent
Sidoti et al.

(10) Patent No.: US 10,779,458 B2
(45) Date of Patent: Sep. 22, 2020

(54) MONITORING AERIAL APPLICATION TASKS AND RECOMMENDING CORRECTIVE ACTIONS

(71) Applicant: International Business Machines Corporation, Armonk, NY (US)

(72) Inventors: Stefano Sidoti, Rome (IT); Agostino Sturaro, Cona (IT)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 15/828,575

(22) Filed: Dec. 1, 2017

(65) Prior Publication Data

US 2019/0166752 A1    Jun. 6, 2019

(51) Int. Cl.
| | | |
|---|---|---|
| *A01B 79/00* | (2006.01) | |
| *G05D 1/00* | (2006.01) | |
| *G06T 5/00* | (2006.01) | |
| *G06K 9/00* | (2006.01) | |
| *G05D 1/10* | (2006.01) | |

(Continued)

(52) U.S. Cl.
CPC .......... *A01B 79/005* (2013.01); *B64C 39/024* (2013.01); *B64D 1/16* (2013.01); *G05D 1/0094* (2013.01); *G05D 1/104* (2013.01); *G06K 9/00657* (2013.01); *G06T 5/006* (2013.01); *B64C 2201/12* (2013.01); *B64C 2201/122* (2013.01); *B64C 2201/123* (2013.01); *G06T 11/60* (2013.01)

(58) Field of Classification Search
CPC .... A01B 79/005; G05D 1/0094; G05D 1/104; G06K 9/00657; G06T 5/006; G06T 11/60; B64C 2201/123; B64C 39/024; B64C 2201/12; B64C 2201/122; B64D 1/16
See application file for complete search history.

(56) References Cited

U.S. PATENT DOCUMENTS

| | | |
|---|---|---|
| 7,143,980 B2 | 12/2006 | Heller et al. |
| 9,382,003 B2 | 7/2016 | Burema et al. |

(Continued)

FOREIGN PATENT DOCUMENTS

| | | |
|---|---|---|
| CN | CN103950540 A | 7/2014 |
| CN | CN105292483 A | 2/2016 |

(Continued)

OTHER PUBLICATIONS

Mazur, "Six Ways Drones Are Revolutionizing Agriculture", PwC, Jul. 20, 2016, 6 pages. https://www.technologyreview.com/s/601935/six-ways-drones-are-revolutionizing-agriculture/.

(Continued)

*Primary Examiner* — Russell Frejd
(74) *Attorney, Agent, or Firm* — Yee & Associates, P.C.

(57) ABSTRACT

Recommending corrective action during aerial application is provided. An unmanned aerial vehicle is navigated to a geolocation where an aerial application task is currently carried out. First sensor data is received from the unmanned aerial vehicle that characterize a quality of the aerial application task. Measures to be carried out to increase the quality of the aerial application task are determined based on the first sensor data. The measures are outputted while the aerial application task is ongoing so that the aerial application task can be adapted while the aerial application task occurs.

17 Claims, 9 Drawing Sheets

(51) Int. Cl.
B64D 1/16 (2006.01)
B64C 39/02 (2006.01)
G06T 11/60 (2006.01)

(56) References Cited

U.S. PATENT DOCUMENTS

| | | |
|---|---|---|
| 2013/0068892 A1 | 3/2013 | Bin et al. |
| 2014/0263822 A1* | 9/2014 | Malveaux ............ B64C 39/024 244/17.23 |
| 2016/0078375 A1 | 3/2016 | Ethington et al. |
| 2016/0133039 A1 | 5/2016 | Ritter et al. |
| 2016/0253595 A1* | 9/2016 | Mathur ................. G06N 7/005 706/12 |
| 2016/0307448 A1 | 10/2016 | Salnikov et al. |
| 2017/0123424 A1 | 5/2017 | Cavender-Bares |
| 2017/0231213 A1* | 8/2017 | Gordon .............. A01M 7/0089 43/132.1 |
| 2017/0374323 A1* | 12/2017 | Gornik ................ G06T 7/0004 |
| 2018/0108123 A1* | 4/2018 | Baurer .................... A01G 2/00 |
| 2018/0129210 A1* | 5/2018 | Achtelik ................ G01C 5/00 |
| 2018/0129879 A1* | 5/2018 | Achtelik ................ G01C 5/00 |
| 2018/0319499 A1* | 11/2018 | Holly .................. B64C 39/024 |

FOREIGN PATENT DOCUMENTS

| | | | |
|---|---|---|---|
| WO | WO2016029054 A1 | 2/2016 | |
| WO | WO-2017079340 A1 * | 5/2017 | ........... B64C 39/024 |

OTHER PUBLICATIONS

Alsalam et al., "Autonomous UAV with vision based on-board decision making for remote sensing and precision agriculture", 2017 IEEE Aerospace Conference, Mar. 2017, 11 pages.

Faicial et al., "The use of unmanned aerial vehicles and wireless sensor networks for spraying pesticides", Journal of Systems Architecture, vol. 60, Issue 4, Apr. 2014, pp. 393-404. (Abstract Only).

* cited by examiner

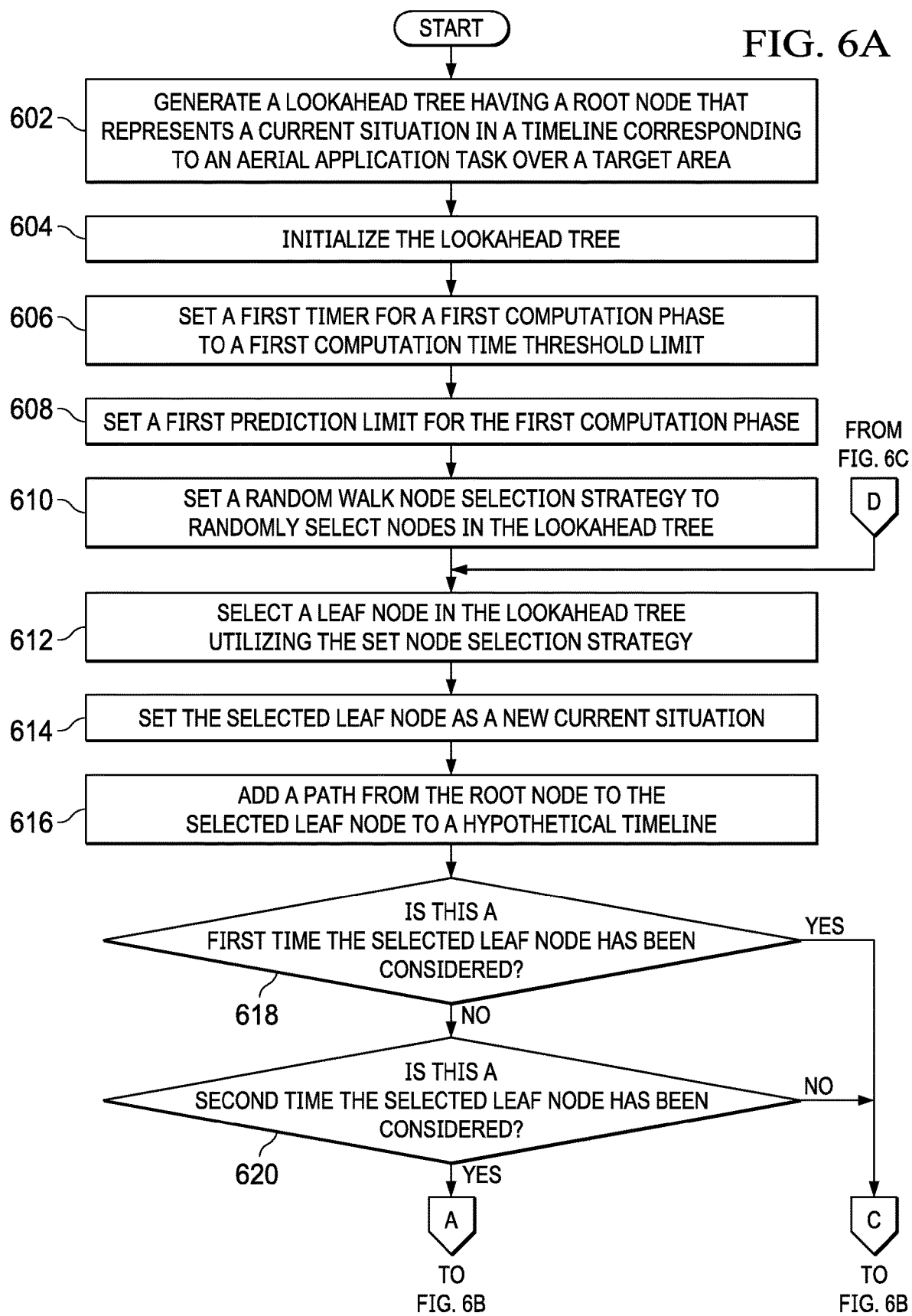

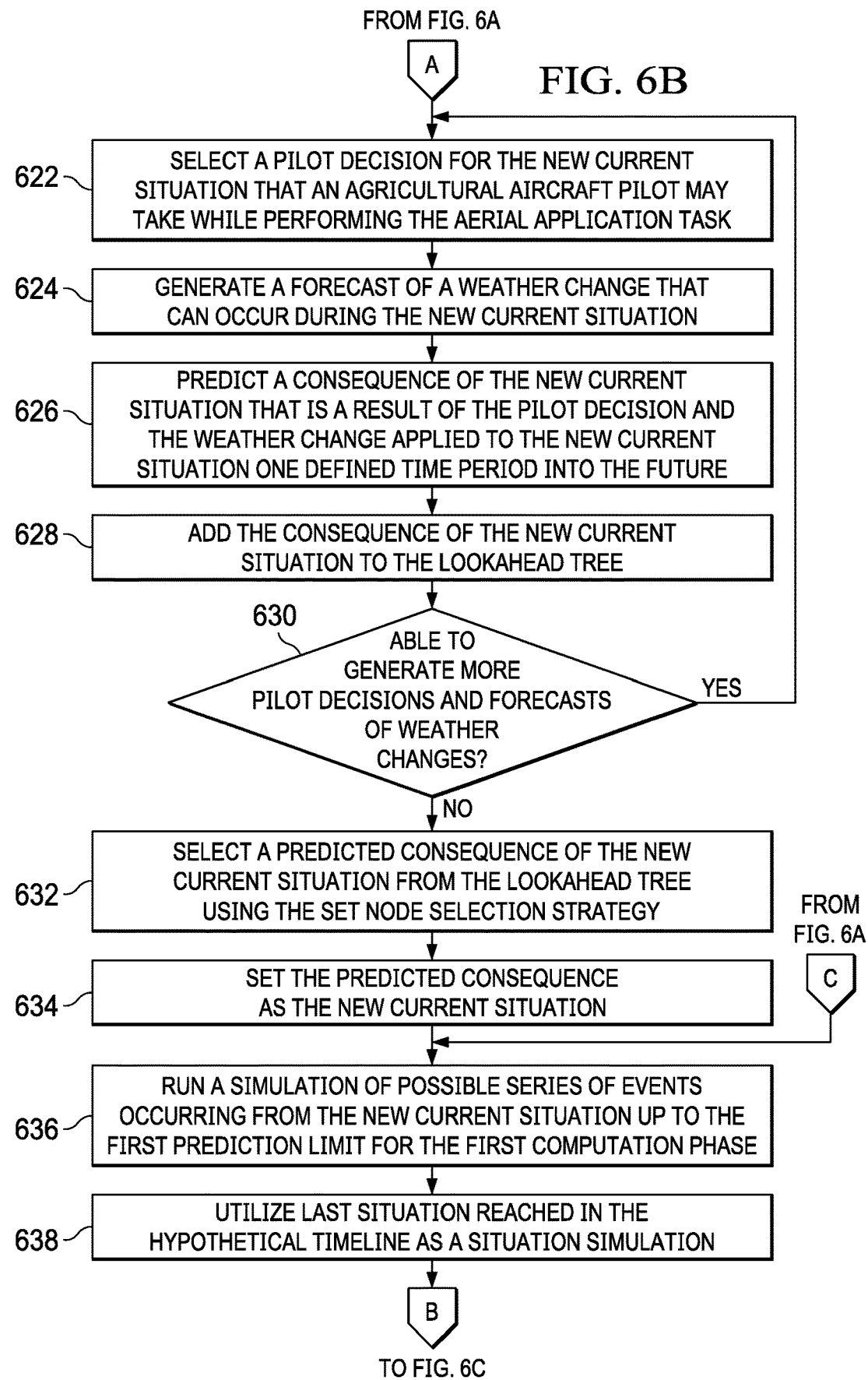

MONITORING AERIAL APPLICATION TASKS AND RECOMMENDING CORRECTIVE ACTIONS

BACKGROUND

1. Field

The disclosure relates generally to aerial application and more specifically to monitoring an aerial application task being performed by an agricultural aircraft pilot over a target area using data provided by a dedicated unmanned aerial vehicle and recommending corrective actions based on the data to ensure the task is performed correctly and to decrease a level of risk while the task is ongoing.

2. Description of the Related Art

Agricultural aircraft may be operated to perform various aerial application tasks over farmland, such as, for example, spraying crops with pesticide (i.e., crop dusting) or with fertilizer (i.e., aerial topdressing) and sowing seeds. Using agricultural aircraft for aerial applications may be more convenient than using other agricultural machinery, especially when dealing with large fields or muddy soil. When dealing with large fields or muddy soil, using trailed sprayers may require more time, may not be financially convenient, or may simply not be possible if the terrain is rendered inaccessible due to unfavorable conditions, such as the presence of deep mud.

However, aerial application by agricultural aircraft can be a challenging and risky task, which is usually done by flying the agricultural aircraft close to the ground. As a result, precision flying is needed to ensure that the aerial application delivers the desired quantity of product over the target area, without applying any of the product outside of the target area. For example, an agricultural aircraft pilot needs to fly at low altitude to reduce unintended dispersion of the product, which may be moved by wind gusts, especially when spaying the product.

If aerial application does not cover a spot of land in the target area that should have been covered, then negative consequences may exist. For example, if the agricultural aircraft pilot does not properly perform crop dusting over the entire target area, then some pests may survive in spots within the target area, eventually spreading back to the whole crop, reducing crop yields, and causing financial losses. Conversely, over-delivering the product in some spots within the target area also may have negative consequences. For example, spraying too much fertilizer over crops may cause "fertilizer burn" and negatively affect crop growth. In addition, aerial application of a product, especially a toxic product, such as a pesticide, over an area where the product was not intended may harm people and wildlife present in that area.

SUMMARY

According to one illustrative embodiment, a method for recommending corrective action during aerial application is provided. An unmanned aerial vehicle is navigated to a geolocation where an aerial application task is currently carried out. First sensor data is received from the unmanned aerial vehicle that characterize a quality of the aerial application task. Measures to be carried out to increase the quality of the aerial application task are determined based on the first sensor data. The measures are outputted while the aerial application task is ongoing so that the aerial application task can be adapted while the aerial application task occurs. According to other illustrative embodiments, a computer system and computer program product for recommending corrective action during aerial application are provided.

BRIEF DESCRIPTION OF THE DRAWINGS

FIGS. 6A-6C are a flowchart illustrating a process for selecting a corrective action recommendation in accordance with an illustrative embodiment.

DETAILED DESCRIPTION

Figure 1:
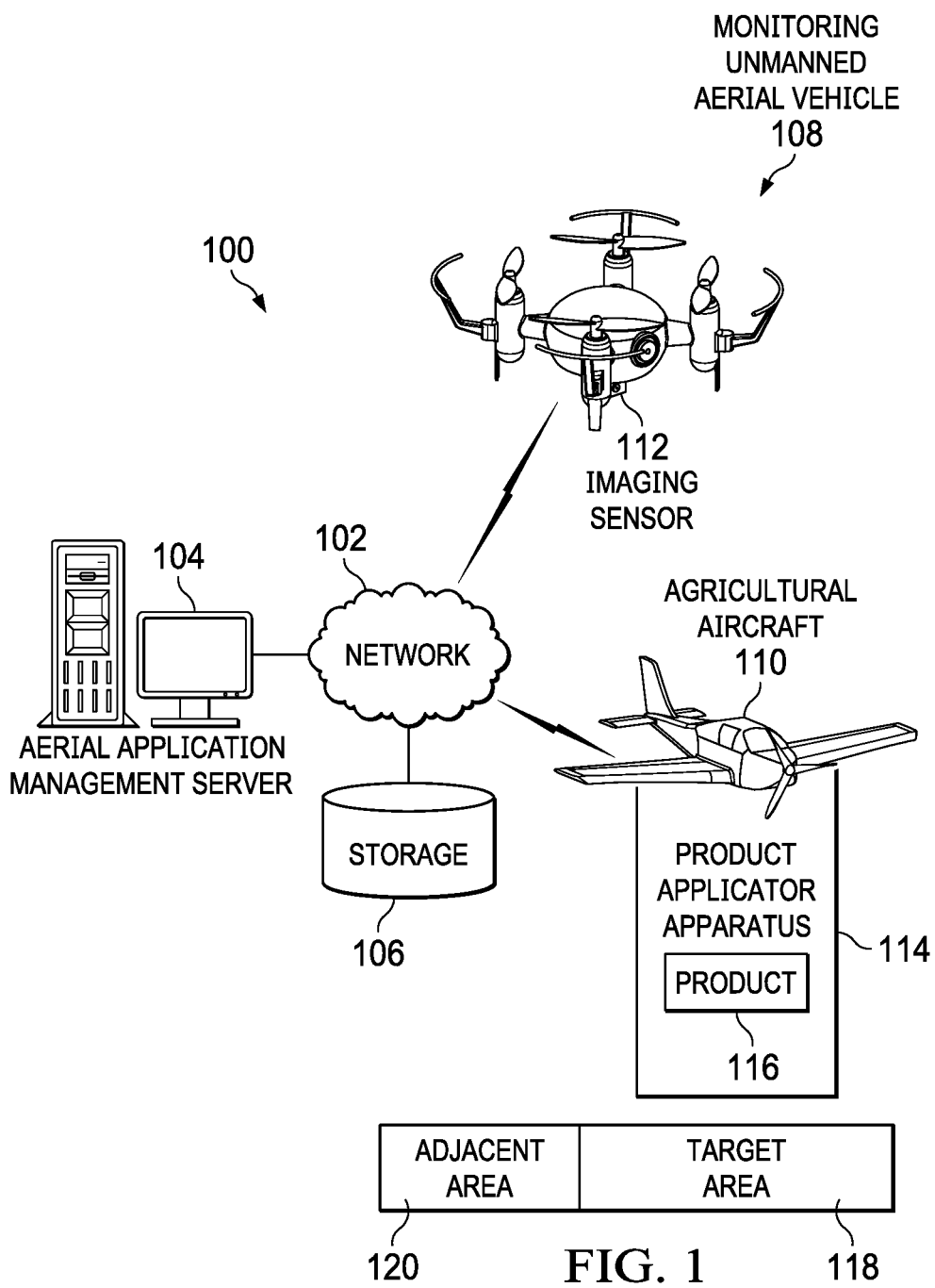
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-4, diagrams of data processing environments are provided in which illustrative embodiments may be implemented. It should be appreciated that FIGS. 1-4 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 connects to network 102, along with storage 106. Server 104 may be, for example, an aerial application management server computer with high-speed connections to network 102. In addition, aerial application management server 104 may provide a set of services to monitor aerial application tasks being performed by agricultural aircraft pilots over target areas using data provided by dedicated unmanned aerial vehicles and recommend corrective actions based on the data to ensure the aerial application tasks are performed correctly and to decrease levels of risk while the tasks are being performed. Also, it should be noted that aerial application management server 104 may represent a plurality of servers hosting a plurality of different aerial application task management services.

Monitoring unmanned aerial vehicle 108 and agricultural aircraft 110 also connect to network 102 via wireless communication links. Monitoring unmanned aerial vehicle 108 and agricultural aircraft 110 are clients of aerial application management server 104. In this example, monitoring unmanned aerial vehicle 108 is illustrated as a drone and agricultural aircraft 110 is illustrated as a single propeller aircraft. However, it should be noted that monitoring unmanned aerial vehicle 108 and agricultural aircraft 110 are meant as examples only and not as limitations on illustrative embodiments. In other words, monitoring unmanned aerial vehicle 108 may represent any type of unmanned aerial vehicle capable of monitoring an aerial application task and agricultural aircraft 110 may represent any type of aircraft capable of performing an aerial application task. A pilot of agricultural aircraft 110 may receive the aerial application task management services provided by aerial application management server 104. The pilot may be, for example, an onboard human pilot, an onboard artificial intelligence pilot, or a remote human pilot controlling agricultural aircraft 110.

Aerial application task management server 104 directly controls the flight of monitoring unmanned aerial vehicle 108. Aerial application task management server 104 positions monitoring unmanned aerial vehicle 108 at an altitude above agricultural aircraft 110 to monitor performance of agricultural aircraft 110 via data received from imaging sensor 112 while agricultural aircraft 110 performs an aerial application task. Imaging sensor 112 may be, for example, a set of one or more still picture cameras and/or video cameras. Agricultural aircraft 110 performs the aerial application task using product applicator apparatus 114 to deploy product 116 over target area 118. Product 116 may be, for example, pesticide, fertilizer, or seed. Target area 118 may be, for example, a defined section or plot of farmland for growing crops.

It should be noted that aerial application task management server 104 monitors agricultural aircraft 110 to ensure that application of product 116 is only over target area 118 and not over adjacent area 120. Adjacent area 120 represents any area adjoining target area 118 that is not intended to receive product 116. If aerial application task management server 104 predicts or detects that agricultural aircraft 110 will or is applying product 116 to adjacent area 120, then aerial application task management server 104 sends a recommendation to the pilot of agricultural aircraft 110 with instructions to make appropriate flight corrections. However, it should be noted that aerial application task management server 104 may take control of agricultural aircraft 110 to implement the corrective actions automatically instead of, or in addition, to sending the recommendation. For example, aerial application task management server 104 may transmit a control signal to product applicator apparatus 114 directing product applicator apparatus 114 to automatically adjust an amount of the dispersal of product 116 over target area 118.

Storage 106 is a network storage device capable of storing any type of data in a structured format or an unstructured format. In addition, storage 106 may represent a plurality of network storage devices. Further, storage 106 may store identifiers for a plurality of monitoring unmanned aerial vehicles; identifiers for a plurality of agricultural aircraft; user goal data; aerial application task situation data; pilot decision data; historical aerial application task timeline data; lookahead trees; corrective action recommendations; and the like. Furthermore, storage unit 106 may store other types of data, such as authentication or credential data that may include user names, passwords, and biometric data associated with users and system administrators, for example.

In addition, it should be noted that network data processing system 100 may include any number of additional servers, monitoring unmanned aerial vehicles, agricultural aircraft, storage devices, and other devices not shown. Program code located in network data processing system 100 may be stored on a computer readable storage medium and downloaded to a computer or other data processing device for use. For example, program code may be stored on a computer readable storage medium on aerial application task management server 104 and downloaded to monitoring unmanned aerial vehicle 108 and/or agricultural aircraft 110 via network 102 for use on monitoring unmanned aerial vehicle 108 and agricultural aircraft 110.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

Figure 2:
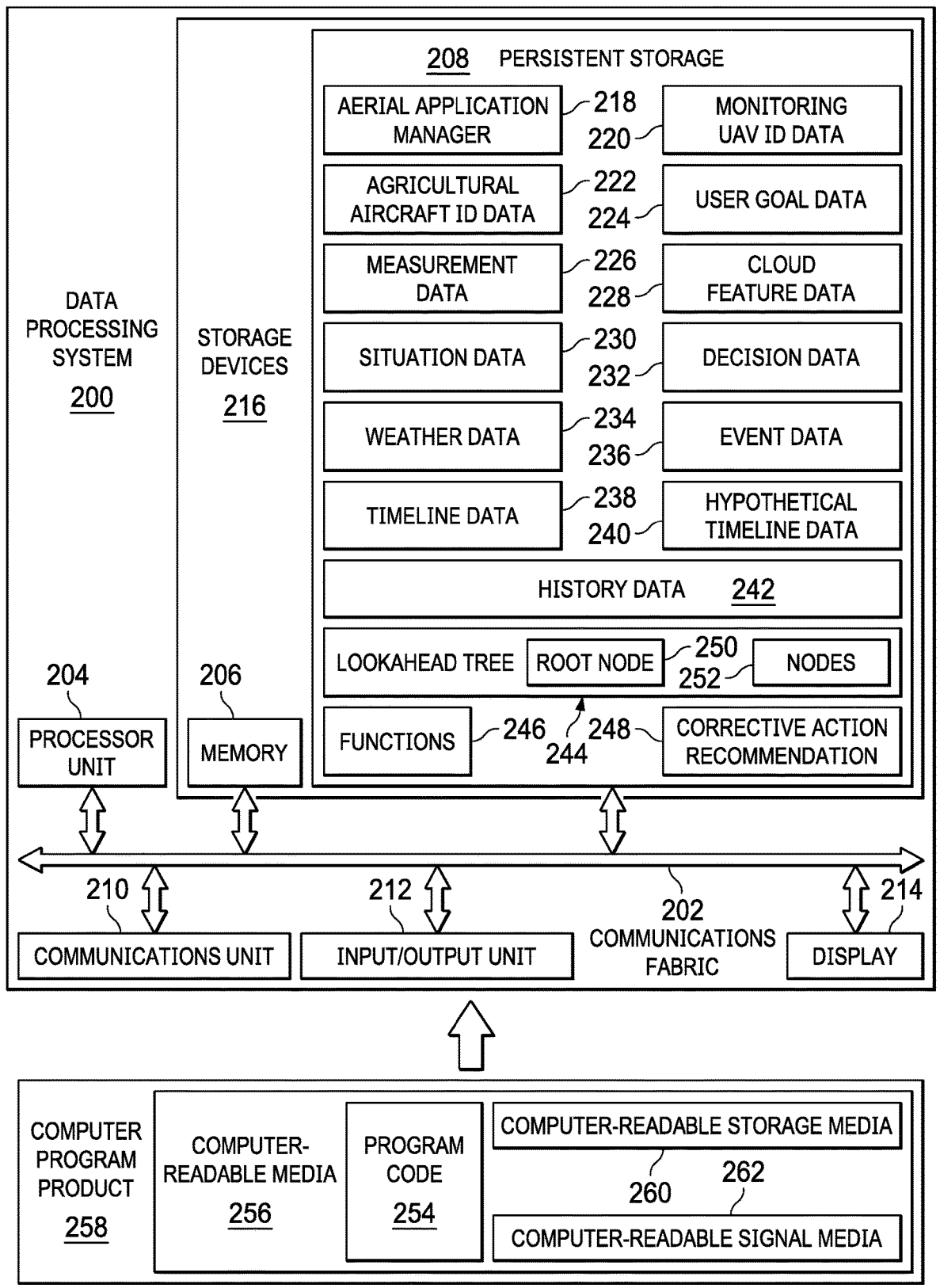
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as aerial application task management server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores aerial application manager 218. However, it should be noted that even though aerial application manager 218 is illustrated as residing in persistent storage 208, in an alternative illustrative embodiment aerial application manager 218 may be a separate component of data processing system 200. For example, aerial application manager 218 may be a hardware component coupled to communication fabric 202 or a combination of hardware and software components. In another alternative illustrative embodiment, a first set of components of aerial application manager 218 may be located on data processing system 200, while a second set of components of aerial application manager 218 may be located on a second data processing system, such as a data processing system onboard agricultural aircraft 110 in FIG. 1.

Aerial application manager 218 controls the process of monitoring an aerial application task being performed by an agricultural aircraft over a target area using data received from a dedicated unmanned aerial vehicle and recommending corrective actions based on the received data to ensure that the aerial application task is performed as intended and to decrease risk levels while the task is ongoing. For example, aerial application manager 218 receives aerial application task input from a user of data processing system 200. The aerial application task input may include, for example: a definition (e.g., geolocation coordinates) of a target area that is to receive aerial application of a product, such as pesticide or fertilizer; how much of the product (e.g., how many cubic centimeters of the product per square meter of land) is to be delivered over the target area, along with product distribution tolerance ranges; data regarding capabilities of the agricultural aircraft, such as top speed, acceleration, turning range, cargo limits, how much of the product can the agricultural aircraft deliver per second, and positions of spaying nozzles on the agricultural aircraft; and data regarding capabilities of the monitoring unmanned aerial vehicle, such as top speed, acceleration, turning range, autonomy, sensor specifications, and specifications of an imaging device, such as a camera, on the monitoring unmanned aerial vehicle.

Aerial application manager 218 controls the unmanned aerial vehicle, which continuously transmits sensor data and a video stream of images, which the imaging device captures, to aerial application manager 218. Further, aerial application manager 218 establishes communications with the agricultural aircraft that is performing the aerial application task. The agricultural aircraft communicates its instrumentation and sensor data to aerial application manager 218. Aerial application manager 218 shares details of aerial application manager 218's global view of aerial application task performance and provides feedback when aerial application manager 218 determines that a warning or recommendation to the agricultural aircraft pilot is necessary.

Aerial application manager 218 analyzes the streamed video received from the monitoring unmanned aerial vehicle by applying pattern recognition to identify the agricultural aircraft within the target area. If aerial application manager 218 successfully identifies the agricultural aircraft within the target area, then aerial application manager 218 associates geolocation position information transmitted by the agricultural aircraft with the streamed video information received from the monitoring unmanned aerial vehicle. If aerial application manager 218 fails to identify the agricultural aircraft within the target area, then aerial application manager 218 utilizes the geolocation position information received from the agriculture aircraft and information regarding an orientation of the imaging device on the monitoring unmanned aerial vehicle to determine a field of view of the imaging device and whether the agricultural aircraft should be inside the field of view of the imaging device. If aerial application manager 218 determines that the agricultural aircraft is outside the field of view of the video camera on the monitoring unmanned aerial vehicle, then aerial application manager 218 starts maneuvering the monitoring unmanned aerial vehicle so that the agricultural aircraft is inside the field of view of the imaging device. Otherwise, aerial application manager 218 waits for more information.

When aerial application manager 218 determines that the agricultural aircraft is inside the field of view of the imaging device on the monitoring unmanned aerial vehicle, then aerial application manager 218 indicates to the pilot of the agricultural aircraft to start the aerial application task. Aerial application manager 218 compares current video images of the target area with previous video images, identifies sections within the target area that have changed based on comparing the video images, and searches for a product cloud emanating from the agricultural aircraft. If aerial application manager 218 identifies a product cloud emanating from the agricultural aircraft, then aerial application manager 218 records a position and shape of the product cloud. Otherwise, aerial application manager 218 waits for more data. Subsequently, aerial application manager 218 repositions the monitoring unmanned aerial vehicle in order for aerial application manager 218 to increase visibility of the agricultural aircraft to determine what the agricultural aircraft is currently doing.

Aerial application manager 218 tracks movement of the product cloud emanating from the agricultural aircraft, a size of the product cloud, and a transparency level at various points along the shape of the product cloud. Aerial application manager 218 runs a simulation to predict how the product cloud emanating from the agricultural aircraft will spread and how particles of the product cloud will settle on the target area and/or adjacent areas. Aerial application manager 218 also determines a risk level associated with the aerial application task and a probability of the agricultural aircraft pilot making a mistake in performance of the aerial application task during the short term (e.g., within the next predefined number of seconds, such as for example, twenty to thirty seconds). Possible mistakes aerial application manager 218 may consider are, for example: spillage of the product outside the target area; delivering too much or too little of the product over a section of land within the target area; missing a section of land within the target area; and aerial maneuvers that put the agricultural aircraft at risk.

If aerial application manager 218 determines that the probability of the agricultural aircraft pilot making a mistake is greater than or equal to a defined mistake threshold level, then aerial application manager 218 generates a corrective action recommendation for the short term (e.g., within the next predefined number of seconds, such as for example, three to five seconds). Afterward, aerial application manager 218 communicates the mistake the agricultural aircraft pilot is at risk of committing and recommends one or more corrective actions to decrease the level of risk to the pilot and agricultural aircraft.

Aerial application manager 218 tracks the aerial application task for the entire duration of the aerial application task and records current data describing task performance at predetermined time intervals. Aerial application manager 218 stores decisions (e.g., actions) taken by the agricultural aircraft pilot and consequences of each decision to build a historical database of information that aerial application manager 218 can utilize during the next aerial application task and/or share with other remote aerial application management servers.

At any given moment, aerial application manager 218 knows what portion of the target area has received aerial application of the product and what quantity of the product has been deployed on that portion of the target area. Aerial application manager 218 periodically transmits this information to the agricultural aircraft pilot. The user of data processing system 200 also has access to this information and can verify that the aerial application task is being carried out correctly and, if not, determine what mistakes have been made regarding the aerial application task.

Also in this example, persistent storage 208 stores monitoring unmanned aerial vehicle (UAV) identifier (ID) data 220, agricultural aircraft ID data 222, user goal data 224, measurement data 226, cloud feature data 228, situation data 230, decision data 232, weather data 234, event data 236, timeline data 238, hypothetical timeline data 240, history data 242, lookahead tree 244, functions 246, and corrective action recommendation 248. Aerial application manager 218 utilizes this information to perform processes of illustrative embodiments. However, it should be noted that different illustrative embodiments may store and utilize more or less information than illustrated in this example.

Aerial application manager 218 utilizes monitoring UAV ID data 220 and agricultural aircraft ID data 222 to uniquely identify and communicate with the monitoring UAV and agricultural aircraft corresponding to the aerial application task currently being performed. User goal data 224 are a set of data provided by the user corresponding to the aerial application task (e.g., field owner). User goal data 224 may include, for example, detailed specifications on the target area to be covered by the aerial application task and a quantity of the product to be delivered on the target area, along with acceptable tolerance ranges.

Measurement data 226 include instrumentation and sensor data transmitted by both the agricultural aircraft and the monitoring UAV. Measurement data 226 may include, for example: position, direction, and altitude of the agricultural aircraft; true airspeed and indicated airspeed of the agricultural aircraft; angle of bank of the agricultural aircraft; quantity of fuel in the agricultural aircraft; quantity of product for the aerial application task carried in the agricultural aircraft; quantity of product emitted by the agricultural aircraft; position, direction, and altitude of the monitoring UAV; wind speed; air pressure; air temperature; and humidity.

Cloud feature data 228 represent a set of data regarding a cloud of product emanating from the agricultural aircraft that is extrapolated by aerial application manager 218 based on information received from the monitoring UAV and the agricultural aircraft. Cloud feature data 228 are an internal representation of the shape of the product cloud, position of the product cloud over the ground, and estimated density of the product cloud at various points along the shape of the product cloud.

Situation data 230 are a set of data that includes a timestamp and references user goal data 224, measurement data 226, and cloud feature data 228 at that particular point in time (i.e., at that timestamp). In other words, situation data 230 represent a picture of what is currently occurring at that moment in the target area. Decision data 232 are a set of decisions or actions that the pilot of the agricultural aircraft takes during a defined reaction period of time, such as for example, three to five seconds. Specifically, decision data 232 may include any changes in speed and direction of the agricultural aircraft the pilot applies during a single defined reaction time period.

Weather data 234 are a set of data describing a change in environmental conditions occurring during a single defined period of time. However, it should be noted that unlike decision data 232 above, weather data 234 describe changes beyond the control of the agricultural aircraft pilot and aerial application manager 218.

Event data 236 are a set of data describing all changes that occur from one situation to another situation over a single defined period of time. In other words, an event is a set of changes that lead to a current situation from a previous situation that occurred, for example, ten seconds ago. An event references a decision and a weather change happening at the same moment.

Timeline data 238 are a chain of situations connected by events. A timeline starts from a situation, which evolves into a second situation once the first event happens. The second situation evolves into the third situation once the second event happens, and so on, until a final situation exists. Aerial application manager 218 records a timeline using the data it receives from the agricultural aircraft and the monitoring UAV. Aerial application manager 218 may share a timeline with another remote aerial application management server.

It should be noted that a timeline is hypothetical when the timeline does not entirely consist of situations and events observed in reality. Hypothetical timeline data 240 represent a timeline that starts from a chain of situations and events observed in reality, but proceed forward with a series of situations and events obtained through predictions and simulations. It should also be noted that a hypothetical timeline is structurally identical to an actual timeline.

History data 242 are a set of timelines aerial application manager 218 previously recorded from actual observations. History data 242 do not include any hypothetical timelines. Also, history data 242 do not include a current timeline (i.e., a timeline started with the current aerial application task).

Lookahead tree 244 is a tree-like diagram or data structure that shows various outcomes from a series of different decisions. Lookahead tree 244 starts with a single situation (i.e., root node 250) that is part of a real timeline (i.e., not a hypothetical timeline) and then branches into a series of hypothetical timelines describing many possible future alternative situations (i.e., nodes 252). In lookahead tree 244, each child of root node 250 represents how the initial situation will evolve one defined time period into the future after a specific event occurs. This specific event is represented by a link between the child node and its parent. In other words, a node in nodes 252 represents the consequences of an event happening in the situation described by its parent node, which is observed after the defined time period.

Each node in nodes 252 in lookahead tree 244 holds a reference to its parent node, a score, and two counters. The two counters are the number of times the node was visited and the number of children nodes corresponding to that node, respectively. Each node in nodes 252, except root node 250, is part of a hypothetical timeline and represents a situation that may occur in the future.

Aerial application manager 218 utilizes functions 246 to generate different calculations, predictions, and recommendations corresponding to the aerial application task. Functions 246 may include, for example, a take decision function, a weather forecast function, a situation consequence function, an evaluate current timeline score function, a risk level function, a node selection function, and the like.

The take decision function takes a current timeline, a history of previous timelines, and a number of children nodes corresponding to a node to predict a pilot decision. As the number of children nodes increases, the take decision function returns an $n^{th}$ possible number of child nodes decision. First, the take decision function returns pilot decisions, which were stored in decision data 232, that were taken in situations similar to the last situation that occurred in the timeline. Then, as the number of children nodes increases, the take decision function returns pilot decisions taken using heuristics and best practices that apply to the last situation considering the timeline that led to the last situation. Finally, for higher values corresponding to the number of children nodes, the take decision function starts returning random pilot decisions compatible with the physical limitations of what the agricultural aircraft can do within the defined time period. By calling this take decision function with an increasing number of children nodes, aerial application manager 218 accounts for the most likely pilot decisions first and then for pilot decisions that can arise from distractions and miscalculations.

The weather forecast function takes the current timeline, the history of previous timelines, and the number child nodes of the $n^{th}$ possible number of child nodes to forecast or predict the weather over the target area. As the number of child nodes increases, the weather forecast function returns a set of different weather forecasts regarding what can change during the next defined time period, starting from the weather forecasts aerial application manager 218 determined most likely to occur and ending with the weather forecasts aerial application manager 218 determined least likely to occur. Each weather forecast is in the form of a "weather change" node.

The situation consequence function takes the current timeline, the pilot decision, and the weather change to determine consequences of the current situation. The consequence function generates a new situation consequence that is a result of the pilot decision and the weather change applied to the immediately preceding situation in the current timeline, after one defined time period in the future.

The evaluate current timeline score function takes a current timeline and evaluates the situation reached at the end of the current timeline to generate a score. The evaluate current timeline score function returns a numeric score in a range between zero (0) and one (1). A zero score indicates an extremely bad situation and a score of one indicates an extremely good situation.

The evaluate current timeline score function takes into account several different factors, such as, for example: a) fraction of the target area reached by the intended amount of product, within the specified tolerance range, during the aerial application task; b) fraction of the target area reached by an excessive amount of product during the aerial application task; c) fraction of the target area reached by an insufficient amount of product during the aerial application task; d) fraction of the target area not reached by the product during the aerial application task; e) degree of uniformity in product coverage in the target area (i.e., aerial application manager 218 generates a score penalizing the presence of missed sections in the target area during the aerial application task); f) fraction of an adjacent bordering area to the target area unintentionally reached by the product during the aerial application task; and g) degree of safety associated with the agricultural aircraft and its onboard human pilot, if present.

The evaluate current timeline score function weights each of these different factors listed above and then the evaluate current timeline score function weights all of the factors against the number of defined time periods that have passed in the current timeline. The evaluate current timeline score function normalizes the numeric value resulting from summing the weighted factors in the current timeline and returns the normalized numeric value as the score for the current timeline. The user also may assign weights to the different factors or provide a custom function that returns scores in the same range.

The risk level function takes the current timeline and the lookahead tree stemming from the latest situation contained in the current timeline to calculate a current risk level corresponding to the agricultural aircraft and its onboard human pilot. The risk level function returns a numeric risk level value in a range between zero (0) and one (1). A risk level of zero indicates an extremely low level of risk, whereas a risk level of one indicates an extremely high level of risk. The risk level function takes into account several different factors, such as, for example: a) fraction of future choices in the lookahead tree that evaluate as good (e.g., have a risk level score closer to zero); b) absolute number of discovered future choices that evaluate as good; and c) mean score of possible future choices. The risk level function also takes into account the trend followed by these different factors. For example, a sudden reduction of the numeric value corresponding to these factors, respective to the current situations in the current timeline, may be indicative of a growing risk (i.e., increased risk level).

The node selection function takes the lookahead tree and selects a node based on a value of a node selection strategy parameter, which may be set to random walk, Upper Confidence Bound 1 (UCB1), or a user-implemented lookahead tree search algorithm. When the node selection strategy parameter is set to random walk, the node selection function starts the search from the root node of the lookahead tree, selects a random child node, and moves to the randomly selected child node. Then, the node selection function randomly selects a child node of the randomly selected child node the node selection function moved to and repeats this process until the node selection function reaches a leaf node. The node selection function returns the leaf node as a possible future situation simulation result. It should be noted that illustrative embodiments implement the node selection function in a way that guarantees the random selection of nodes will be uniform. When the node selection strategy parameter is set to UCB1, the node selection function uses an Upper Confidence Bound 1 algorithm to select nodes in the lookahead tree.

Corrective action recommendation 248 represents a set of one or more recommendations and/or warnings that aerial application manager 218 generates and sends to the agricultural aircraft pilot performing the aerial application task. A recommendation may be, for example, instructions on how to prevent application of the product on an unintended area adjacent to the target area based on aerial application manager 218 detecting or predicting a gust of wind over the target area. A warning may be, for example, instructions on how to decrease a level of risk in performance of the aerial application task based on aerial application manager 218 receiving flight data from instrumentation onboard the agricultural aircraft.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 254 is located in a functional form on computer readable media 256 that is selectively removable and may be loaded onto or transferred to data processing system 200 for running by processor unit 204. Program code 254 and computer readable media 256 form computer program product 258. In one example, computer readable media 256 may be computer readable storage media 260 or computer readable signal media 262. Computer readable storage media 260 may include, for example, an optical or magnetic disc that is inserted or placed into a drive or other device that is part of persistent storage 208 for transfer onto a storage device, such as a hard drive, that is part of persistent storage 208. Computer readable storage media 260 also may take the form of a persistent storage, such as a hard drive, a thumb drive, or a flash memory that is connected to data processing system 200. In some instances, computer readable storage media 260 may not be removable from data processing system 200.

Alternatively, program code 254 may be transferred to data processing system 200 using computer readable signal media 262. Computer readable signal media 262 may be, for example, a propagated data signal containing program code 254. For example, computer readable signal media 262 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 254 may be downloaded over a network to persistent storage 208 from another device or data processing system through computer readable signal media 262 for use within data processing system 200. For instance, program code stored in a computer readable storage media in a data processing system may be downloaded over a network from the data processing system to data processing system 200. The data processing system providing program code 254 may be a server computer, a client computer, or some other device capable of storing and transmitting program code 254.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 260 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Illustrative embodiments utilize dedicated unmanned aerial vehicles, such as drones, and cognitive technologies to monitor aerial application tasks performed by agricultural aircraft over a target area. The dedicated unmanned aerial vehicles provide continuous aerial application task feedback. Illustrative embodiments dynamically recommend flight adjustments to the agricultural aircraft pilot based on the continuous feedback to ensure that the applied product is dispensed in the intended quantity, the target area is fully covered, and the applied product is not dispersed over unintended adjacent areas.

Illustrative embodiments deploy the monitoring drones, which are equipped with a multitude of sensors, over the target area (e.g., a field of crops) before agricultural aircraft start their aerial application tasks. Illustrative embodiments utilize cognitive learning to analyze the sensor data provided by the monitoring unmanned aerial vehicles and the agricultural aircraft, compare the sensor data with historical sensor data records and user-provided data sample records, and verify that the aerial application task is proceeding as intended. Illustrative embodiments perform the verification process in real-time to provide feedback to the pilots of the agricultural aircraft, which may be human pilots or automated artificial intelligence pilots. Illustrative embodiments utilize the real-time monitoring of the aerial product application task to detect spots within the target area missed by the aerial application and unintended dispersion of the delivered product. Further, illustrative embodiments also may perform a post analysis of the data collected by the monitoring unmanned aerial vehicles and provide the post analysis to a stakeholder, such as an owner of the treated field, so that the stakeholder can verify that the aerial application tasks were carried out correctly.

Existing methods focus on scheduling an aerial application task in advance, generating an aerial application plan, and then performing the aerial application task according to the plan by remotely controlling a set of unmanned aerial vehicles to perform the task. It should be noted that existing methods perform the aerial application task by following the predetermined plan and fully controlling the operation of the set of unmanned aerial vehicles. After existing methods complete the aerial application task according to the predetermined plan, existing methods do not store any historical records corresponding to the aerial application task.

Illustrative embodiments consider a different scenario where an agricultural aircraft pilot, either locally or remotely, performs the aerial application task and the illustrative embodiments verify that the agricultural aircraft pilot is performing the aerial application task correctly and safely in real-time. Illustrative embodiments perform the roles of monitoring and warning. Illustrative embodiments monitor the aerial application task operation instead of controlling it. Illustrative embodiments dynamically provide recommendations to the agricultural aircraft pilot in response to the illustrative embodiments identifying potentially risky or dangerous situations or events that may lead to undesirable or disastrous results.

The pilot of the agricultural aircraft and the artificial intelligence (AI) pilot controlling the monitoring unmanned aerial vehicle, interface with a remote aerial application management computer. The agricultural aircraft pilot or AI pilot controlling the monitoring unmanned aerial vehicle may act on and follow warnings and/or recommendations provided by the remote aerial application management computer, but are not required to do so (i.e., may act independently from the warnings and recommendations). Illustrative embodiments are capable of learning through observation of aerial application task performance and linking pilot decisions and events illustrative embodiments observe to their consequences in relation to aerial application task performance success criteria defined by the user. Illustrative embodiments utilize an unmanned aerial vehicle with the dedicated purpose of aerial application task monitoring and providing an elevated point of observation for the remote aerial application management computer.

Thus, illustrative embodiments shift from direct control of aerial application task operations to monitoring aerial application tasks performed by the agricultural aircraft pilot. Illustrative embodiments also shift from creating an aerial application task plan in advance to generating warnings and recommendations in real-time on the fly. In addition, illustrative embodiments shift from enforcing the predetermined aerial application task plan to continuously verifying effectiveness of aerial application task performance. Further, illustrative embodiments shift from no post aerial application task performance analysis to performing post aerial application task performance by analyzing data evidence and learning from the data analysis.

Figure 3:
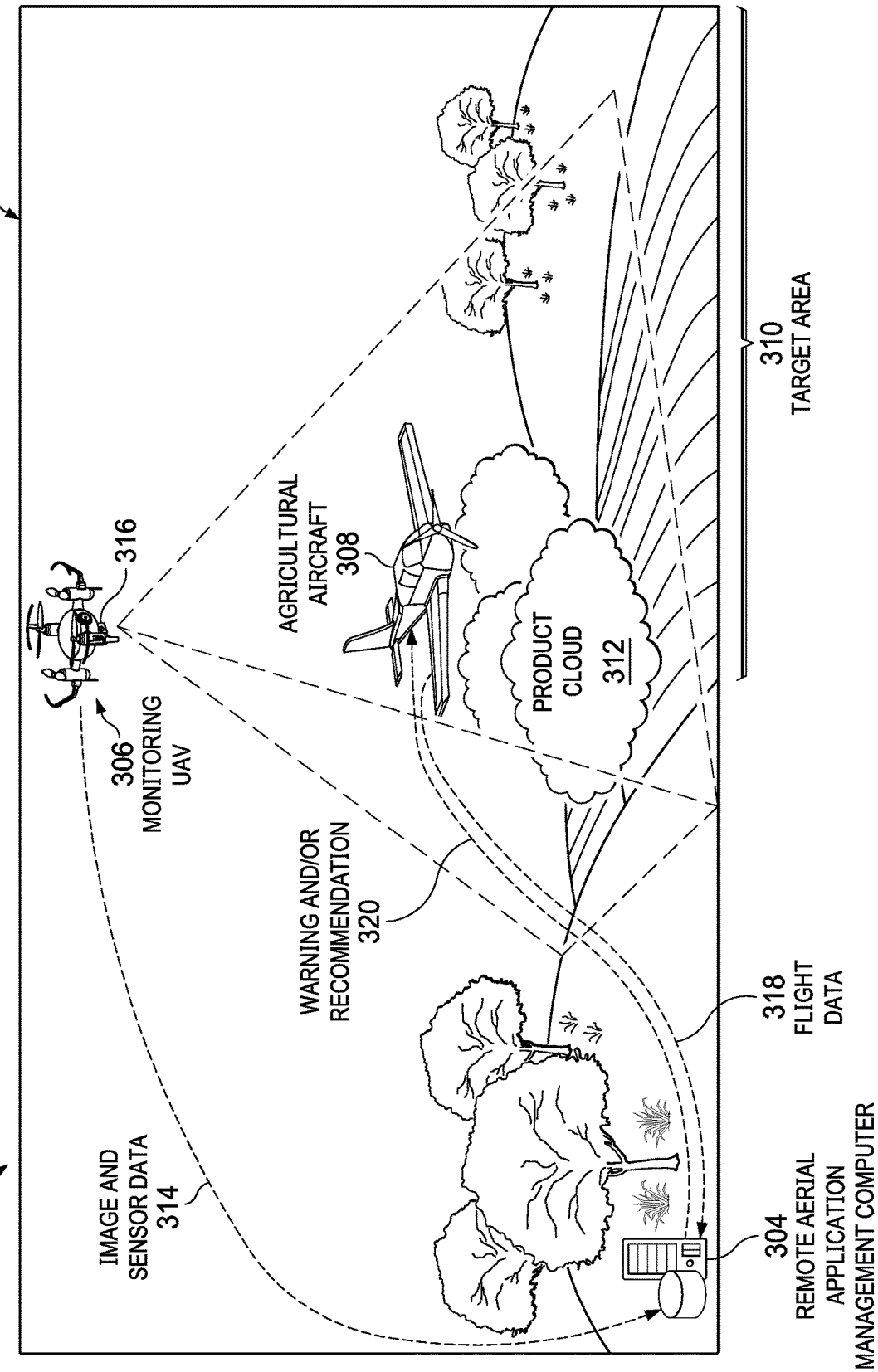
FIG. 3 is a diagram illustrating an example of an aerial application process in which illustrative embodiments may be implemented.
Figure 4:
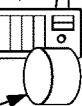
FIG. 4 is a diagram illustrating an example of a problematic aerial application process in which illustrative embodiments may be implemented.
Figure 5:
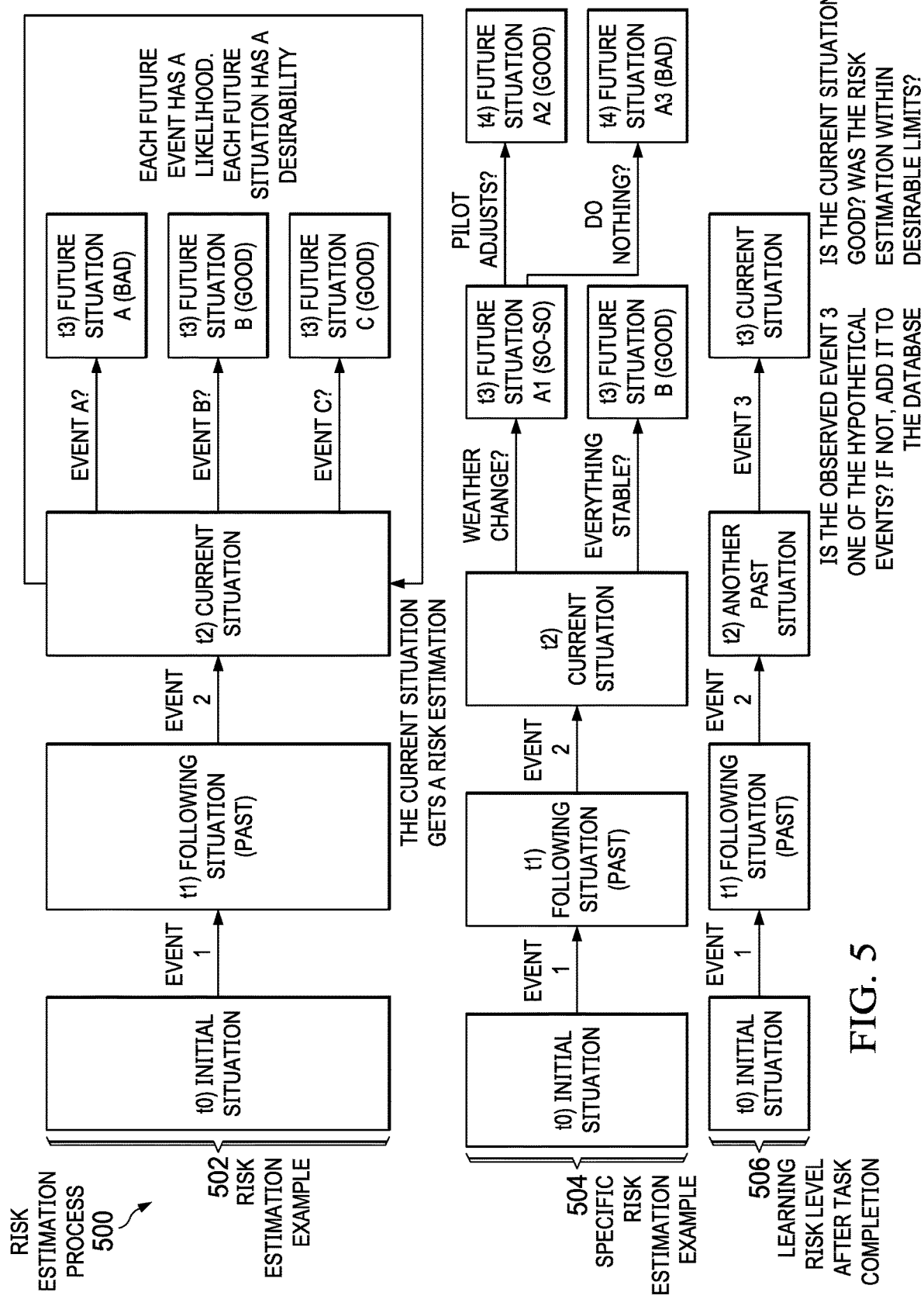
FIG. 5 is a diagram illustrating an example of a risk estimation process in which illustrative embodiments may be implemented.
Figure 6C:
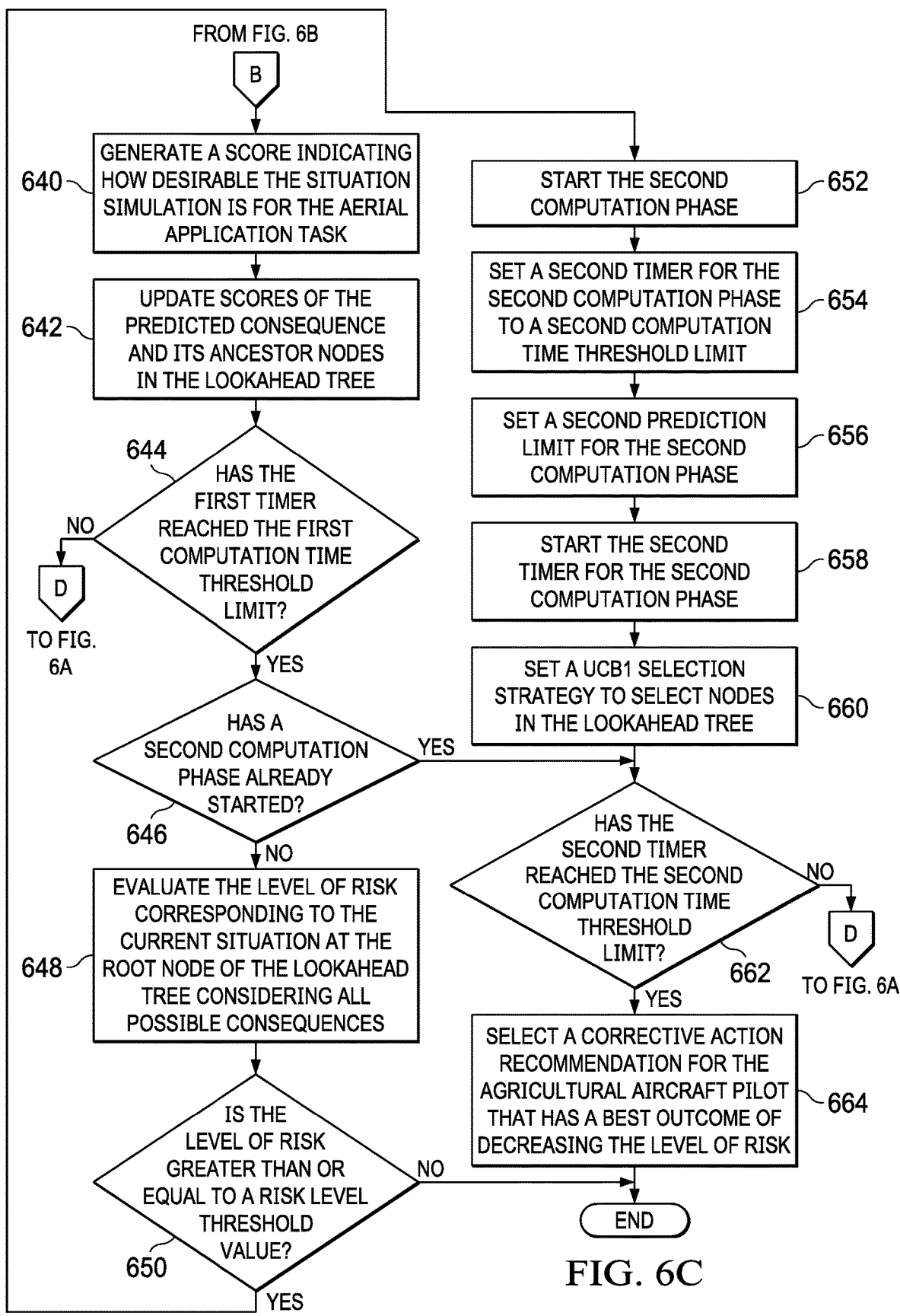

With reference now to FIG. 3, a diagram illustrating an example of an aerial application process is depicted in which illustrative embodiments may be implemented. Aerial application process 300 represents the process of applying a product to a target area via aerial application. Aerial application process 300 may be implemented in a network of data processing systems, such as network data processing system 100 in FIG. 1.

In this example, aerial application task environment 302 includes remote aerial application management computer 304, monitoring UAV 306, agricultural aircraft 308, and target area 310. Remote aerial application management computer 304, monitoring UAV 306, agricultural aircraft 308, and target area 310 may be, for example, aerial application management server 104, monitoring UAV 1086, agricultural aircraft 110, and target area 118 in FIG. 1. Agricultural aircraft 308 deploys the product using a product applicator apparatus over target area 310 to form product cloud 312. The product being deployed by the product applicator apparatus, may be, for example, product 116 in product applicator apparatus 114 in FIG. 1.

Remote aerial application management computer 304 tracks and monitors monitoring UAV 306, agricultural aircraft 308, target area 310, and product cloud 312 using image and sensor data 314 received from monitoring UAV 306. Monitoring UAV 306 captures the image data using imaging device 316, such as imaging sensor 112 in FIG. 1. In addition, remote aerial application management computer 304 may optionally receive flight data 318 from instrumentation onboard agricultural aircraft 308 to further monitor agricultural aircraft 308.

Based on image and sensor data 314 and/or flight data 318, remote aerial application management computer 304 transmits warnings and recommendations 320 to the pilot of agricultural aircraft 308 providing instructions on how to perform one or more corrective actions, if necessary. Warnings and recommendations 320 may be, for example, corrective action recommendation 248 in FIG. 2.

With reference now to FIG. 4, a diagram illustrating an example of a problematic aerial application process is depicted in which illustrative embodiments may be implemented. Problematic aerial application process 400 is similar to aerial application process 300 in FIG. 3. However, in contrast to aerial application process 300, problematic aerial application process 400 detects or predicts a problem occurring during performance of the aerial application task.

In this example, aerial application task environment 402 includes remote aerial application management computer 404, monitoring UAV 406, agricultural aircraft 408, and target area 410. Agricultural aircraft 408 deploys the product over target area 410 to form product cloud 412. In addition, remote aerial application management computer 404 receives image data 414 of what is currently occurring within aerial application task environment 402.

In this example, gust of wind 416 causes product cloud 412 to deposit the product on an area adjacent to target area 410 causing spillage 418, which is an unintended application of the product on the adjacent area. Remote aerial application management computer 404 detects spillage 418 based on image data 414 and transmits recommendation 420 to the pilot of agricultural aircraft 408 with instructions to lower altitude and increase speed due to gust of wind 416 causing spillage 418 in the adjacent area outside of target area 410.

With reference now to FIG. 5, a diagram illustrating an example of a risk estimation process is depicted in which illustrative embodiments may be implemented. Risk estimation process 500 represents a process of estimating a level of risk while an aerial application task is currently being performed or ongoing. In this example, risk estimation process 500 includes risk estimation example 502, specific risk estimation example 504, and learning risk level after task completion 506.

A remote aerial application management computer, such as, for example, remote aerial application management computer 404 in FIG. 4, has a finite amount of time to identify a current risk level corresponding to an agricultural aircraft and its onboard human pilot and recommend a corrective action to the pilot. The remote aerial application management computer implements this process in two phases. During the first phase, the remote aerial application management computer estimates the level of risk, which is the likelihood of the pilot making a decision that leads to a mistake and the potential consequence or damage that may be caused by that decision. During the second phase, which the remote aerial application management computer executes when the estimated level of risk is greater than or equal to a defined risk level threshold value, the remote aerial application management computer generates a corrective action recommendation with instructions on how to reduce the level of risk by avoiding or reducing the potential consequences or damages arising from pilot decisions (e.g., mistakes), aircraft malfunctions, and/or unfavorable environmental conditions.

The remote aerial application management computer gives each phase a specified time to execute. For example, specified computation time one (1) is the computation time given to the first phase of the process, while specified computation time two (2) is the computation time given to the second phase of the process. Ideally, the total time of execution for both phases should be less than one entire defined time period, such as, for example, thirty seconds.

The remote aerial application management computer also maintains a prediction limit, which is a maximum number of defined time periods the remote aerial application management computer utilizes to predict future situations. The remote aerial application management computer keeps this time window larger during the first phase of the process (e.g., twenty to twenty-five seconds) and then narrow during the second phase of the process (e.g., three to five seconds). In fact, during the first phase of the process, the remote aerial application management computer wants to examine more possible situations that can soon lead to a bad or risky situation in order to get a more accurate estimate of the current level of risk. During the second phase of the process, the remote aerial application management computer wants to generate recommendations that can lead to a reduction in the current level of risk for a longer time interval than just for the current defined time period. The remote aerial application management computer utilizes different functions, such as, for example, functions 246 in FIG. 2, takes as input the current timeline that led to the current situation and the history of timelines stored in a storage device, such as, for example, persistent storage 208 in FIG. 2, of the remote aerial application management computer to calculate the level of risk and generate the corrective action recommendation.

With reference now to FIGS. 6A-6C, a flowchart illustrating a process for selecting a corrective action recommendation is shown in accordance with an illustrative embodiment. The process shown in FIGS. 6A-6C may be implemented in a computer, such as, for example, aerial application management server 104 in FIG. 1 or data processing system 200 in FIG. 2.

The process begins when the computer generates a lookahead tree having a root node that represents a current situation in a timeline corresponding to an aerial application task over a target area (step 602). The computer also initializes the lookahead tree (step 604). In addition, the computer sets a first timer for a first computation phase, which estimates a level of risk corresponding to the aerial application task, to a first computation time threshold limit (step 606).

Further, the computer sets a first prediction limit for the first computation phase that defines a maximum number of defined time periods to predict into the future (step 608). Furthermore, the computer sets a random walk node selection strategy to select nodes in the lookahead tree (step 610). Moreover, the computer selects a leaf node in the lookahead tree utilizing the set node selection strategy (step 612).

The computer sets the selected leaf node as a new current situation (step 614). The computer then adds a path from the root node to the selected leaf node to the timeline to obtain a hypothetical timeline of what occurred up to the new current situation (step 616). The computer makes a determination as to whether this is a first time the selected leaf node has been considered (step 618). If computer determines that this is the first time the selected leaf node has been considered, yes output of step 618, then the process proceeds to step 636. If computer determines that this is not the first time the selected leaf node has been considered, no output of step 618, then the computer makes a determination as to whether this is a second time the selected leaf node has been considered (step 620).

If computer determines that this is not the second time the selected leaf node has been considered, no output of step 620, then the process proceeds to step 636. If computer determines that this is the second time the selected leaf node has been considered, yes output of step 618, then the computer selects a pilot decision for the new current situation that an agricultural aircraft pilot may take while performing the aerial application task based on previous pilot decisions taken during same or similar situations (step 622). In addition, the computer generates a forecast of a weather change that can occur during the new current situation (step 624).

Afterward, the computer predicts a consequence of the new current situation that is a result of the pilot decision and the weather change applied to the new current situation one defined time period into the future (step 626). The computer adds the consequence of the new current situation to the lookahead tree corresponding to the aerial application task (step 628). Subsequently, the computer makes a determination as to whether the computer is able to generate more pilot decisions and forecasts of weather changes (step 630).

If the computer determines that more pilot decisions and forecasts of weather changes can be generated, yes output of step 630, then the process returns to step 622 where the computer selects another pilot decision for the new current situation. If the computer determines that no more pilot decisions and forecasts of weather changes can be generated, no output of step 630, then the computer selects a predicted consequence of the new current situation from the lookahead tree using the set node selection strategy (step 632). Further, the computer sets the predicted consequence as the new current situation (step 634). Furthermore, the computer runs a simulation of possible series of events occurring from the predicted consequence of the new current situation that extends the hypothetical timeline by recursively applying pilot decisions, weather changes, and situation consequences in a loop up to the first prediction limit for the first computation phase (step 636).

The computer utilizes a last situation reached in the hypothetical timeline at the first prediction limit corresponding to the first phase as a situation simulation (step 638). The computer generates a score indicating how desirable the situation simulation is for the aerial application task (step 640). The computer updates scores of the predicted consequence and its ancestor nodes in the lookahead tree to account for the generated score corresponding to the situation simulation reflecting an impact of a possible outcome of the situation simulation (step 642).

Subsequently, the computer makes a determination as to whether the first timer reached the first computation time threshold limit (step 644). If the computer determines that the first timer has not reached the first computation time threshold limit, no output of step 644, then the process returns to step 612 where the computer selects another leaf node in the lookahead tree. If the computer determines that the first timer has reached the first computation time threshold limit, yes output of step 644, then the computer makes a determination as to whether a second computation phase, which generates corrective action recommendations, already started (step 646).

If the computer determines that the second computation phase has already started, yes output of step 646, then the process proceeds to step 662. If the computer determines that the second computation phase has not already started, no output of step 646, then the computer evaluates the level of risk corresponding to the current situation at the root node of the lookahead tree taking into account what occurred before the new current situation in the timeline and what could happen next in the lookahead tree considering all possible consequences (step 648). Afterward, the computer makes a determination as to whether the level of risk is greater than or equal to a risk level threshold value (step 650).

If the computer determines that the level of risk is less than the risk level threshold value, no output of step 650, then the process terminates thereafter. If the computer determines that the level of risk is greater than or equal to the risk level threshold value, yes output of step 650, then the computer starts the second computation phase (step 652). In addition, the computer sets a second timer for the second computation phase to a second computation time threshold limit (step 654). Further, the computer sets a second prediction limit, which defines a maximum number of defined time periods to predict into the future, for the second computation phase (step 656).

The computer starts the second timer for the second computation phase (step 658). Moreover, the computer sets a UCB1 selection strategy to select nodes in the lookahead tree (step 660). Also, the computer makes a determination as to whether the second timer reached the second computation time threshold limit (step 662).

If the computer determines that the second timer has not reached the second computation time threshold limit, no output of step 662, then the process returns to step 612 where the computer selects another leaf node in the lookahead tree. If the computer determines that the second timer has reached the second computation time threshold limit, yes output of step 662, then the computer selects a corrective action recommendation for the agricultural aircraft pilot that has a best outcome in the lookahead tree of decreasing the level of risk (step 664). Thereafter, the process terminates.

Figure 7:
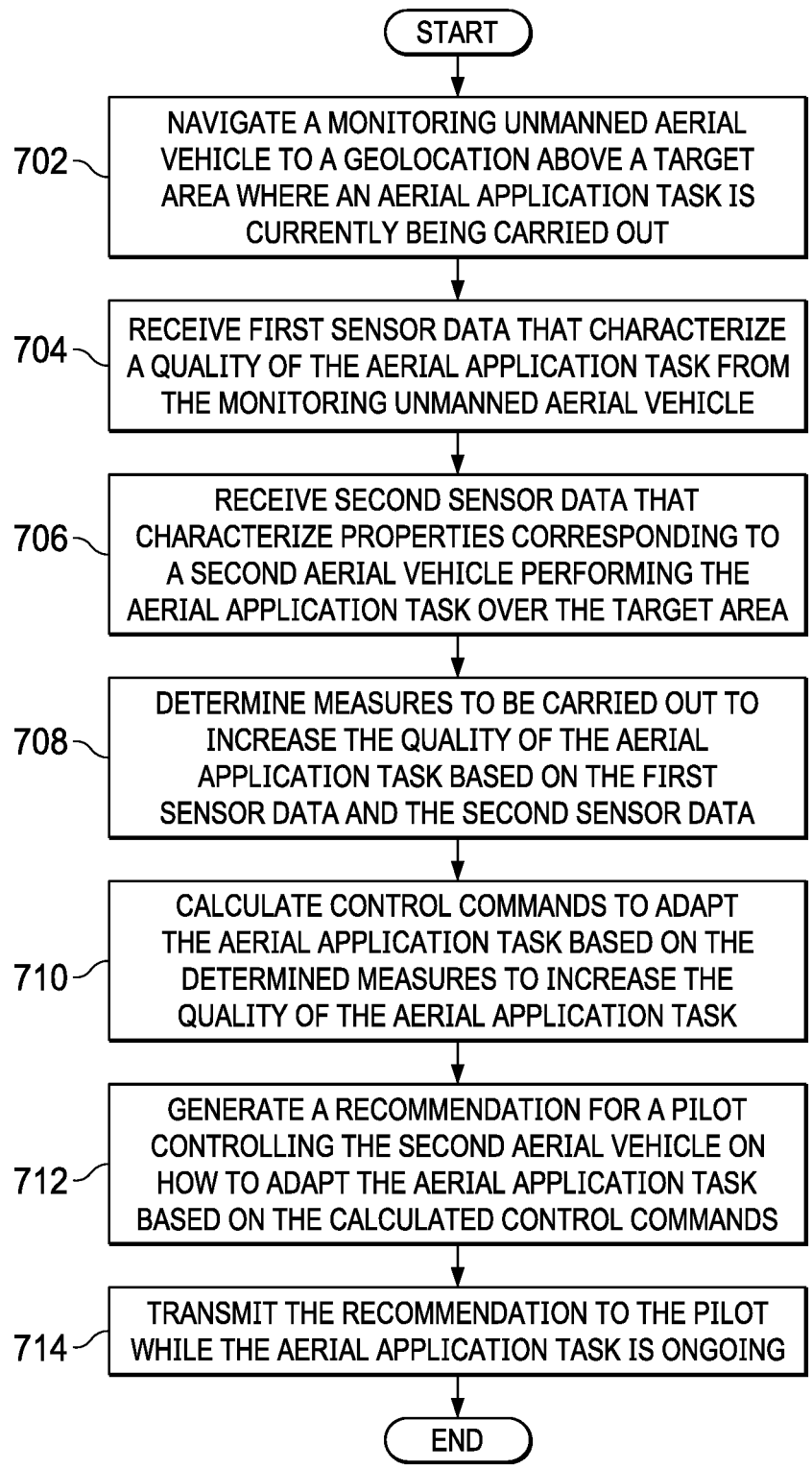
FIG. 7 is a flowchart illustrating a process for generating a pilot recommendation while performing an aerial application task in accordance with an illustrative embodiment.

With reference now to FIG. 7, a flowchart illustrating a process for generating a pilot recommendation while performing an aerial application task is shown in accordance with an illustrative embodiment. The process shown in FIG. 7 may be implemented in a computer, such as, for example, aerial application management server 104 in FIG. 1 or data processing system 200 in FIG. 2.

The process begins when the computer navigates a monitoring unmanned aerial vehicle to a geolocation above a target area where an aerial application task is currently being carried out (step 702). The computer receives first sensor data that characterize a quality of the aerial application task from the monitoring unmanned aerial vehicle (step 704). In addition, the computer receives second sensor data that characterize properties corresponding to a second aerial vehicle performing the aerial application task over the target area (step 706).

The computer determines measures to be carried out to increase the quality of the aerial application task based on the first sensor data and the second sensor data (step 708). The measures may be, for example, to change altitude and/or speed, modify flight path or direction, modify product output, temporarily suspend product output, and the like. Further, the computer calculates control commands to adapt the aerial application task based on the determined measures to increase the quality of the aerial application task (step 710). Furthermore, the computer generates a recommendation for a pilot controlling the second aerial vehicle on how to adapt the aerial application task based on the calculated control commands (step 712).

The computer transmits the recommendation to the pilot controlling the second aerial vehicle while the aerial application task is ongoing so that the pilot can adapt the aerial application task while the aerial application task is occurring over the target area (step 714). Thereafter, the process terminates.

Thus, illustrative embodiments of the present invention provide a computer-implemented method, computer system, and computer program product for monitoring an aerial application task being performed by an agricultural aircraft pilot over a target area and recommending corrective actions to ensure the task is performed correctly and to decrease a level of risk while the task is currently ongoing. The monitoring of the aerial application is performed by a dedicated monitoring drone, interacting with a remote server that takes advantage of the elevated point of view over the agricultural aircraft to detect risks and identify mistakes and is able to detect and monitor, for example, how wind affects a cloud of sprayed product released behind the agricultural aircraft. The effectiveness of the actions carried out by the agricultural aircraft doing the aerial application task is dynamically and continuously evaluated by the remote server, instead of the remote server just making sure that the actions match a predefined plan. The remote server also is able to recognize risky situations during the aerial application task by predicting what can happen over the next configured time interval, and provides recommendations to minimize the risk of mistakes by dynamically calculating corrective actions that can be carried out by the agricultural aircraft pilot performing the aerial application task. The pilot actions carried out during the aerial application task are monitored as a series of linked events that the remote server stores and later uses to learn from, being able to tell what pilot decisions or actions lead to a particular error or mistake.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for recommending corrective action during aerial application, the method comprising:
   navigating, by a data processing system, an unmanned aerial vehicle to a geolocation where an aerial application task is currently carried out;
   receiving, by the data processing system, first sensor data from the unmanned aerial vehicle that characterize a quality of the aerial application task;
   receiving, by the data processing system, second sensor data from a second aerial vehicle performing the aerial application task that characterize properties corresponding to the second aerial vehicle;
   determining, by the data processing system, measures to be carried out to increase the quality of the aerial application task based on the first sensor data, wherein the determining of the measures is based on the first sensor data and the second sensor data; and
   outputting, by the data processing system, the measures while the aerial application task is ongoing so that the aerial application task can be adapted while the aerial application task occurs.

2. The method of claim 1, wherein the second aerial vehicle is an artificial intelligence controlled aerial vehicle, the method further comprising:
   calculating control commands based on the measures; and
   sending the control commands to the artificial intelligence controlled aerial vehicle to adapt the aerial application task while the aerial application task is ongoing.

3. The method of claim 2, wherein the second aerial vehicle is a human controlled aerial vehicle, the method further comprising:
   generating a recommendation with instructions on how to adapt the aerial application task based on the control commands; and
   sending the recommendation on how to adapt the aerial application task to the human controlled aerial vehicle while the aerial application task is ongoing.

4. The method of claim 3, further comprising:
   detecting a problem while performing the aerial application task, wherein the recommendation is based on the problem.

5. The method of claim 1 further comprising:
   generating a lookahead tree having a root node that represents a current situation in a timeline corresponding to the aerial application task;
   setting a first timer for a first computation phase, which estimates a level of risk corresponding to the aerial application task, to a first computation time threshold limit;
   setting a first prediction limit for the first computation phase that defines a maximum number of defined time periods to predict into a future;
   setting a random walk node selection strategy to select nodes in the lookahead tree;
   selecting a leaf node in the lookahead tree utilizing the set node selection strategy;
   setting the leaf node as a new current situation; and
   adding a path from the root node to the leaf node to the timeline to obtain a hypothetical timeline of what occurred up to the new current situation.

6. The method of claim 5 further comprising:
   selecting a pilot decision for the new current situation that an agricultural aircraft pilot may take while performing the aerial application task based on previous pilot decisions taken during same or similar situations;
   generating a forecast of a weather change that can occur during the new current situation;
   applying the pilot decision and the weather change to the current situation one defined time period into the future;
   predicting a consequence of the new current situation that is a result of the pilot decision and the weather change applied to the new current situation one defined time period into the future; and
   adding the consequence of the new current situation to the lookahead tree.

7. The method of claim 6 further comprising:
   selecting a predicted consequence of the new current situation from the lookahead tree using the set node selection strategy;
   setting the predicted consequence as the new current situation;
   running a simulation of possible series of events occurring from the predicted consequence of the new current situation that extends the hypothetical timeline by applying pilot decisions, weather changes, and situation consequences recursively up to the first prediction limit for the first computation phase; and
   utilizing a last situation reached in the hypothetical timeline at the first prediction limit corresponding to the first computation phase as a situation simulation.

8. The method of claim 7 further comprising:
   generating a score indicating how desirable the situation simulation is for the aerial application task; and
   updating scores of the predicted consequence and its ancestor nodes in the lookahead tree to account for the score corresponding to the situation simulation reflecting an impact of a possible outcome of the situation simulation.

9. The method of claim 1, wherein the unmanned aerial vehicle is a dedicated monitoring unmanned aerial vehicle that captures images of a second aerial vehicle performing the aerial application task, a target area of the aerial application task, and a cloud of product emitted by the second aerial vehicle while performing the aerial application task.

10. The method of claim 9, wherein a remote computer controls the dedicated monitoring unmanned aerial vehicle.

11. The method of claim 1, wherein the unmanned aerial vehicle provides feedback to the data processing system regarding the aerial application task while the aerial application task occurs.

12. The method of claim 11, wherein the aerial application task is applying a product to a target area by the second aerial vehicle, and wherein the feedback is used by the data processing system to mitigate issues regarding applying the product to the target area.

13. A computer system for recommending corrective action during aerial application, the computer system comprising:
   a bus system;
   a storage device connected to the bus system, wherein the storage device stores program instructions; and
   a processor connected to the bus system, wherein the processor executes the program instructions to:
      navigate an unmanned aerial vehicle to a geolocation where an aerial application task is currently carried out;
      receive first sensor data from the unmanned aerial vehicle that characterize a quality of the aerial application task;

determine measures to be carried out to increase the quality of the aerial application task based on the first sensor data; and output the measures while the aerial application task is ongoing so that the aerial application task can be adapted while the aerial application task occurs, wherein the processor further executes the program instructions to:

receive second sensor data from a second aerial vehicle performing the aerial application task that characterize properties corresponding to the second aerial vehicle, wherein determining the measures is based on the first sensor data and the second sensor data.

14. The computer system of claim 13, wherein the second aerial vehicle is an artificial intelligence controlled aerial vehicle, and wherein the processor further executes the program instructions to:

calculate control commands based on the measures; and send the control commands to the artificial intelligence controlled aerial vehicle to adapt the aerial application task while the aerial application task is ongoing.

15. A computer program product for recommending corrective action during aerial application, the computer program product comprising a computer readable storage medium having program instructions embodied therewith, the program instructions executable by a computer to cause the computer to perform a method comprising:

navigating an unmanned aerial vehicle to a geolocation where an aerial application task is currently carried out;

receiving first sensor data from the unmanned aerial vehicle that characterize a quality of the aerial application task;

receiving second sensor data from a second aerial vehicle performing the aerial application task that characterize properties corresponding to the second aerial vehicle;

determining measures to be carried out to increase the quality of the aerial application task based on the first sensor data, wherein the determining of the measures is based on the first sensor data and the second sensor data; and outputting the measures while the aerial application task is ongoing so that the aerial application task can be adapted while the aerial application task occurs.

16. The computer program product of claim 15, wherein the second aerial vehicle is an artificial intelligence controlled aerial vehicle, the method further comprising:

calculating control commands based on the measures; and sending the control commands to the artificial intelligence controlled aerial vehicle to adapt the aerial application task while the aerial application task is ongoing.

17. The computer program product of claim 16, wherein the second aerial vehicle is a human controlled aerial vehicle, the method further comprising:

generating a recommendation with instructions on how to adapt the aerial application task based on the control commands; and sending the recommendation on how to adapt the aerial application task to the human controlled aerial vehicle while the aerial application task is ongoing.

\* \* \* \* \*